Patented June 30, 1942

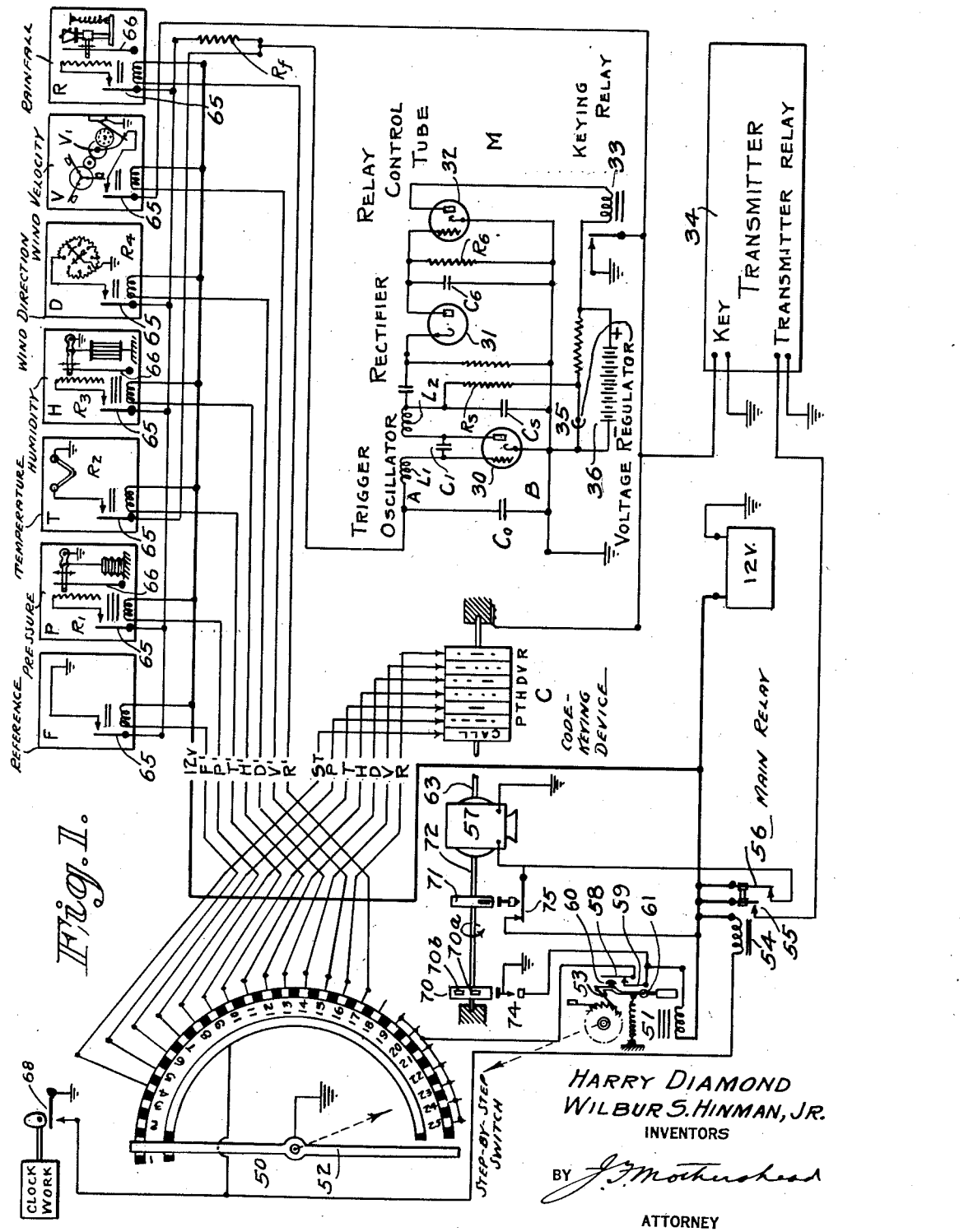

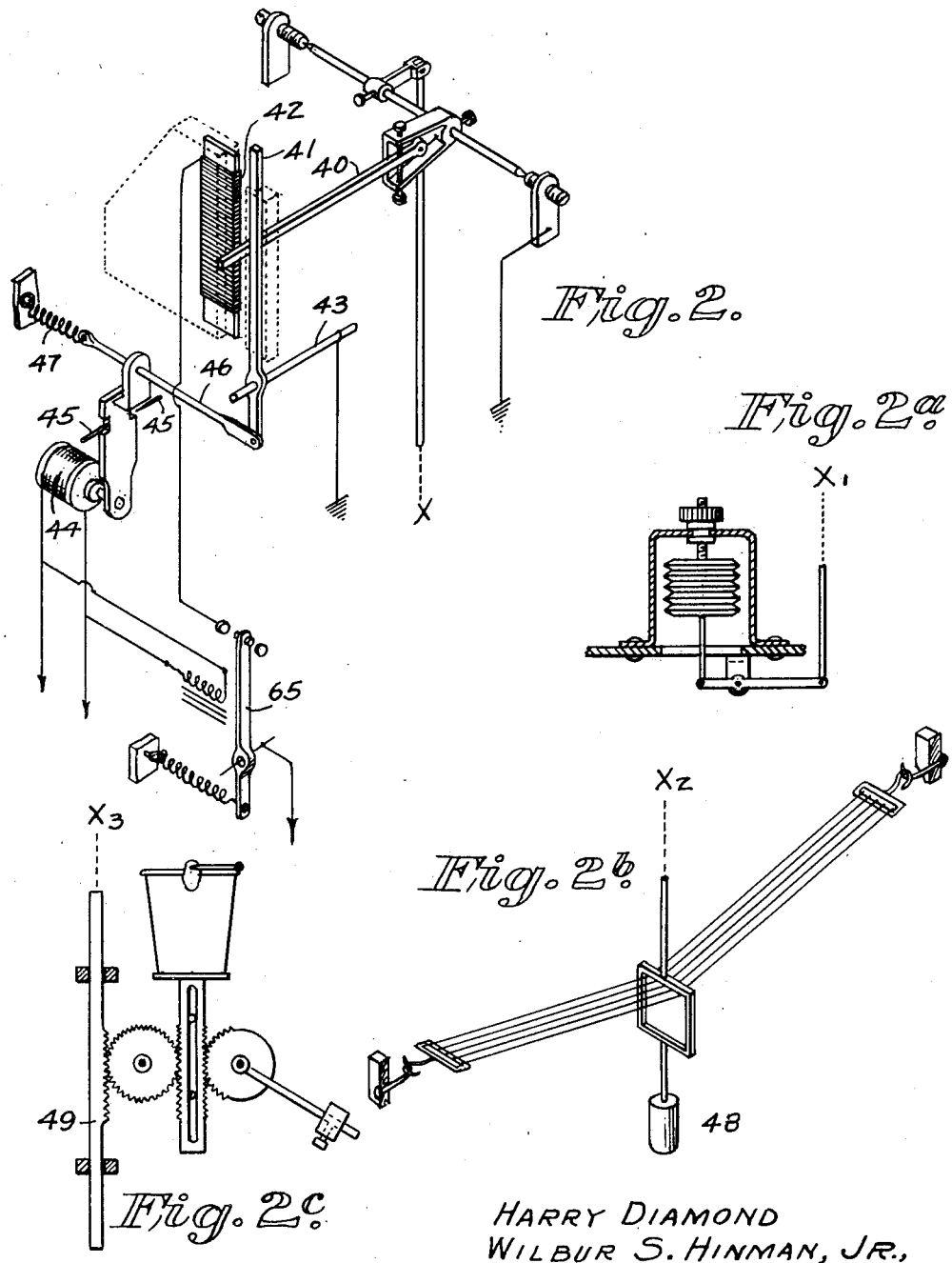

2,287,786

UNITED STATES PATENT OFFICE 2,287,786

AUTOMATIC WEATHER STATION

Harry Diamond, Washington, D. C., and Wilbur S. Hinman, Jr., Falls Church, Va., assignors to the Government of the United States of America, as represented by the Secretary of Commerce Application August 30, 1941, Serial No. 408,954

6 Claims. (Cl. 250—2)

(Granted under the act of March 3, 1883, as amended April 30, 1928; 370 O. G. 757)

The invention herein described may be made and used by and for the Government of the United States for governmental purposes without the payment to us of any royalty thereon or therefor.

This invention relates to automatic weather stations and aims generally to improve the same.

In an automatic weather station, measurements may be required of barometric pressure, ambient temperature and relative humidity, wind velocity and direction, rainfall, visibility, ceiling height, and probably other factors. In accordance with this invention each of the measurements noted may be indicated at a remote point by radio by converting the deflection of the measuring instrument into a corresponding variation of electrical resistance and translating the resistance variation into the variation of a pulse frequency of modulation on the emitted carrier wave.

One object of the invention is to provide a transmitter adapted to stand by in inoperative condition, to be periodically put into operative condition to transmit meteorological information, to identify the source and the information transmitted, and to transmit data determined by devices mechanically responsive to meteorological factors, devices inherently varying in an electrical characteristic in response to such factors, devices mechanically varied in electrical characteristics in response to such factors, or predetermined coding devices, or any or all of them.

Another object is to provide an automatic weather station adapted to automatically convey meteorological information by pulse signals within the discrete aural pulse range, enabling aural reception of the information by field parties and the like without burdening them with special receiving and recording equipment.

Another object is to provide an automatic weather station conveying information by signals within the discrete aural pulse range adapted to inform field parties of any change in its aural pulse calibration.

Another object is to provide improved meteorologic-factor responsive devices adapted to control the factor indicating signals to be transmitted.

Another object is to provide automatic means to initiate the operation of a radio transmitter, allow it to heat up, and thereafter cause it to transmit sequentially signals indicative of meteorological factors.

Other objects and advantages relating to the entire system and to particular novel elements and sub-combinations contributing to the improvement of the whole will be hereinafter described, and the present enumeration of objects and advantages is not to be considered as limiting.

The foregoing objects and advantages may be accomplished individually or collectively in various combinations, and further objects and advantages will appear from the following description of a preferred embodiment of the invention.

In the accompanying drawings of this preferred embodiment illustrative of the invention, Fig. 1 shows diagrammatically a system embodying features of the invention.

Fig. 2 is a partially phantom perspective diagrammatic showing of a novel mechanism for applying deflections of factor responsive instruments to mechanically vary a resistance, while Figs. 2a, 2b and 2c are similar showings of apparatus responsive to barometric pressure, humidity, and rainfall associable with the mechanism according to Fig. 2.

Referring to the illustrative embodiment of Fig. 1, the weather station therein shown comprises a modulating system generally designated M, controlled selectively by resistors varied mechanically by measuring instruments (as indicated generally at P, H, R and D), by inherently variable resistors responsive to selected factors (as exemplified generally at T), by direct keying means responsive to selected factors (as indicated generally at V), by fixed reference keying means (indicated generally at F—R$_f$) and by automatic code-keying means (indicated generally at C) all actuated in a predetermined manner by a control system comprising automatic switching means and associated initiating and stop control means (50—75).

For clarity these several general portions of the system are hereinafter described under separate sub-heads:

1. THE MODULATING SYSTEM

In the illustrative embodiment of Fig. 1, as shown generally at M, the translation of resistance variations into corresponding variations of modulating frequency is accomplished by means of a trigger-type pulse modulating oscillator employing the oscillator tube 30. The oscillatory circuit, L$_1$C$_1$L$_2$, is tuned to any suitable frequency, say about 1 megacycle per second. The 1 megacycle oscillations are interrupted at an audio rate determined by the time constant of the resistance-capacitance network in the trigger oscillator grid circuit, namely, the capacitance C$_0$ and the resistance selectively connected across the points A and B.

The resistance so connected in accordance with this embodiment comprises a variable resistor $R_1$, $R_2$, $R_3$, $R_4$ or $R_5$ (generally in series with a limiting reference resistor, $R_t$, of about 40,000 ohms), and capacitance $C_0$ is a stable condenser of about 8 microfarads capacitance. For the range of resistance values preferably used in the automatic weather station, the range of modulation frequencies may extend from about 0.15 to about 3.0 cycles per second. Because of the low frequencies thus used, it is convenient to speak of the frequencies as so many pulses per second.

The output of the modulating oscillator 30 is coupled to a half-wave rectifier 31 which, in turn, applies negative voltage to the input of the relay control tube 32 across biasing resistor $R_6$. The smoothing filter, $R_8C_8$, in the plate circuit of the modulating oscillator 30, converts the groups of 1-Mc oscillations into corresponding audio-frequency pulses. After rectification, these appear as negative pulses on the grid of the relay control tube 32; their duration is controlled by the time constant of the network $R_6C_6$. The relay 33 is preferably normally in the actuated position; the armature being released upon application of the negative pulses to the grid of the relay control tube and remaining so as long as the grid bias is sufficient to keep the current through the relay coil below the "pull-in" value. The back contact of the relay may thus be used for keying any conventional radiotelegraph transmitter 34. Thus there is no limitation on the power output of the transmitter.

The use of low modulation frequency in accordance with this invention (of the order of 0.15 to 3.0 pulses per second) not only provides for simple modulation of a radio transmitter but also affords considerable simplification in the equipment for measuring and recording the modulation frequencies at the receiving station. Manual observations may be made simply by counting the number of pulses received in a given time interval (say 20 to 40 seconds) as hereinafter described. A stop watch and headphones are sufficient for the purpose. Recorded observations may be obtained with a simple tape recorder of any usual or preferred design, which may provide distinguishable tenth counts and a timing mark on the tape.

The variable resistors $R_1$ to $R_5$ selectably connectable in the grid circuit of the modulating oscillator 30 may be varied mechanically by instrument deflection, or resistors which vary inherently in response to the factors to be measured may be used. In the illustrative embodiment of Fig. 1 the first arrangement is used in the instruments for measuring pressure, humidity, rainfall, and wind direction generally indicated at P, H, R and D, whereas the second arrangement is applied to the measurement of temperature (at T) and may also be used in the measurement of other factors such as visibility and ceiling height. Wind velocity is preferably measured by the direct conversion of the rotation of a cup anemometer into a variable pulse frequency.

A voltage-regulator tube 35 is preferably employed to assure constant plate voltage supply to the modulating oscillator 30 thereby reducing reference-frequency drift, particularly when voltage (shown as supplied by a battery 36) is obtained from the dynamotor which furnishes plate supply to the radio transmitter 34.

2. RESISTORS VARIED MECHANICALLY BY MEASURING INSTRUMENTS

Fig. 2 shows the mechanism used in accordance with the invention for converting the deflection of any meteorological instrument such as a barometer (Fig. 2a) into a resistance variation. The instrument operated pointer, 40, swings freely between a clamping bar, 41, and the edge of a wire-wound resistor 42 which may have, in the illustrative embodiment, a resistance of about 100,000 ohms. The clamping bar 41 moves about the pivot 43, and serves to clamp the pointer 40 against the resistor 42 when the relay 44 is actuated to swing the armature about its pivot axis 45 and thus advance the clamping bar actuator 46 against the action of retractor spring 47. The variable resistance is formed between one end of the resistor 42 and the instrument operated pointer 40 which constitutes the variable contact point. The field coil of the relay 44 is excited when an observation of the factor by which pointer 40 is operated is required. (The timing and switching arrangement for starting the automatic weather station and for selecting the observations from the several instruments in the desired sequence are hereinafter described under sub-heads numbers 5 and 6.) Details of the linkage system for operating the pointer, 40 (Fig. 2), from the evacuated bellows of a barometer (Fig. 2a) are conventional and evident from a study of these two figures, bearing in mind that link $x$ of Fig. 2 is connected to link $x_1$ of Fig. 2a in the pressure responsive instrument.

It will be evident that this general arrangement for converting the deflection of an instrument pointer into a proportional value of resistance, exemplified in Figs. 2 and 2a, may be applied to any instrument no matter how delicate. An obvious advantage lies in the fact that the pointer reaches its reading position without friction introduced by the electric contact.

The application of this arrangement to the hair hygrometer and to the weighing-type rain gage is evident from Figures 2b and 2c, respectively, bearing in mind that for these instruments link $x$ of a converter unit according to Fig. 2 will be connected to link $x_2$ or $x_3$ of the respective instruments of Figs. 2b and 2c.

In Fig. 2b the hair hygrometer is held in tension by any suitably positioned weight exemplified at 48, and in Fig. 2c the weighing type rain gage is geared to operate a rack 49 connected with the link $x_3$.

The conversion of the position of a wind vane into a corresponding value of resistance is most readily accomplished through the use of a series of different fixed resistors which are switched into circuit as the wind vane passes through its principal positions. The standard wind vane used in the embodiment of Fig. 1 at D has eight equally spaced switching positions as shown; hence seven different resistors are used, connected across seven pairs of the eight contact points as shown. From this arrangement it would appear that only wind directions corresponding to the eight principal compass points would be indicated. However, it is possible to provide effective indication for additional points intermediate the principal points by taking advantage of the fact that the wind vane oscillates considerably about its average position when the wind velocity exceeds a few knots per hour. The cams for switching in the resistors cover an arc of only just under 45 degrees (instead of 60 degrees in the standard wind vane), so that if the wind direction corresponds to a principal position only one resistor is connected into circuit. However, if the wind direction is intermediate to two principal directions, the two corresponding resistance values will be switched successively into circuit by the oscillation of the vane, so that the number of pulses counted in a convenient time interval (say, 15 seconds) will represent an average value and thus indicate an intermediate direction.

3. INHERENTLY VARIABLE RESISTORS

The inherently variable resistor used for measuring air temperature is shown in Figure 1, at T. It is similar in all respects except size to the electrolytic thermometer of Patent Number 2,261,974, granted November 11, 1941, on application of David N. Craig, filed July 25, 1940, Serial Number 347,470. It consists of a glass capillary tube filled with an electrolyte having a high temperature coefficient of electrical resistance and provided with terminals so that it may be used as a resistor whose value varies in accordance with the ambient temperature. The capillary bore in the form preferred for the automatic weather station is only 0.75 mm. in diameter; the wall is made relatively thick (although this contributes to lag in response) to add materially to the mechanical sturdiness of the device. The end wells are of quite large size and are fitted with heavy copper terminals thus providing for almost indefinite life of the device under the conditions of intermittent service contemplated for the automatic weather station. For a length of capillary of say 22 cm., the device may have a resistance in the neighborhood of 40,000 ohms at +40° C.; at −40° C. its resistance may increase to 480,000 ohms. The time lag constant of the relatively heavy device described in gently moving air (25 m./min.) may be about 2 minutes compared to a 20 second maximum of lag for the Craig tube with the same ventilation. As previously indicated, the increased lag in response is of little importance; temperature changes of the order of 0.5 degree per minute are not frequent, and even in such cases the error introduced would be only 1 degree.

It is evident that the use of an electric hygrometer of the type described in Dunmore application Serial Number 247,243, filed December 22, 1938, for measuring relative humidity is feasible with the system of this invention.

When any one of the several instrument resistors shown diagrammatically at the top of Fig. 1 is connected across points A and B as hereinafter described, the variation of the pulses per second of the transmitter 34 is controlled as a function of the meteorological factor being measured.

For the temperature tube T, and other high resistance devices connection of the device in series with the reference resistor $R_f$ would result in a value of resistance at +40° C. of 80,000 ohms and a corresponding upper-frequency limit of 1.7 pulses per second. Since this would unduly restrict the indicating range, the reference resistor is automatically disconnected in the embodiment of Fig. 1, when the temperature tube is connected into circuit. The upper temperature-indicating frequency in the form shown may then be of the order of 3.0 pulses per second. The reason for connecting the other instrument resistors in series with the reference resistor $R_f$ is that the modulating oscillator becomes unstable for excessively low values of resistance (below about 40,00 ohms) and certain of the instrument resistors may drop below this value in certain portions of their range.

4. DIRECT KEYING BY CUP ANEMOMETER

As previously noted, the rotation of the cup anemometer may be converted directly into a modulation pulse frequency proportional to the wind velocity, without requiring an intermediate conversion into a variable resistance. This is accomplished in the form shown at V in Fig. 1 by stepping up by a suitable factor (shown as a factor of 4) the number of "take-off" contacts in a commercial cup anemometer; one contact then occurs for each three revolutions of the cups in the preferred form. The cup arm is preferably chosen in this embodiment so that the number of contacts occurring in a 15 second interval is numerically equal to the wind velocity in knots per hour. The contact terminals $V_1$ are connected in parallel with the contacts of the keying relay 33 and pulse the radio transmitter 34 in the same way as the keying relay. The range of indication conveniently may be from 0.06 to 6.0 pulses per second for wind velocities ranging from 0.9 to 90 knots per hour. The pulse modulation frequency corresponding to a given wind velocity because of direct keying is seen to have an absolute value, and is not subject to correction for reference-frequency drift of the circuits indicated at M.

5. THE CONTROL SYSTEM

The control system 50—75 for automatic operation of the weather station is shown diagrammatically in Fig. 1. The heart of the system is a rotary step relay or switch 50 of standard design, having in the form shown two parallel banks of 25 contacts each. This switch incorporates a ratchet relay 51 and a grounded moving arm 52. The pawl 53 of ratchet relay 51 is set up for action when the relay field coil is excited and advances the moving arm one step when the excitation is removed.

In the illustrative embodiment the arm 52 is shown bridging the pair of switch contacts corresponding to positions 1 in the 2 banks. The remaining contacts of the inner bank, 2 to 25, inclusive, are connected to the field coil of control relay 54; hence this relay 54 is excited by the 12-volt battery shown (with negative ground connection) when arm 52 is in any position except the first. The control relay 54 operates a double-pole armature 55—56; one pole 55 controlling the power relay of the radio transmitter 34 and the second pole 56 controlling the 12-volt power circuit of a small, constant-speed motor 57 having suitable reduction gearing to rotate shaft 72 at a slow rate, preferably once in 45 seconds in the embodiment shown.

(a) Homing Action

In the 25 contact form shown contacts 19 to 25, inclusive, of the outer bank of the rotary switch 50 are connected to the contact arm 58 of the ratchet relay 51. The contact arm 58 normally rests against the fixed contact 59 of the ratchet relay 51 being moved away from it by movement of the armature 60, pivoted about point 61 when the relay 51 is actuated. The net result is to secure "homing" action of the rotary switch once the grounded arm 52 reaches position 19, as will be evident from a study of the connections.

(B) CODING CONTACTS

In the form shown the even numbered contacts 4—16, inclusive, of the outer bank of the rotary switch 50 are connected to a set of coding circuits generally indicated at C, which provide the station identification signals and the coded connections P, T, H, D, V and R corresponding, respectively, to pressure, temperature, humidity, wind direction, wind velocity, and rainfall.

Other code letters corresponding to visibility, ceiling-height, etc, all may be added by adding the even numbered contacts 18, 20, etc., to the coding network. The coding circuits comprise cam-operated switches generally indicated at C which in the form shown are driven from the motor 57 by shaft 63 which rotates the coding discs C at an appropriate rate and in such synchronism with the cam 70 hereinafter described as to transmit the code pulses of the selected code disc at least once in the 5 second interval provided by the segments of the cam disc 70. The cam operated switches C are connected across the telegraph key terminals of the radio transmitter 34 through the grounding of one side of the respective switch by the appropriate even numbered contacts of the rotary switch 50 by way of the moving arm 52.

(C) OBSERVATION CONTACTS

In the form of Fig. 1, the odd numbered contacts 5 to 17, inclusive, of the outer bank of the rotary switch 50 are connected to relays 65 associated with the measuring elements for connecting the different resistors of the units F, P, T, H, D, R across points A—B of the modulating circuit, and for operating the clamping bars 66 of the pressure humidity and rain gage instruments. In the diagram showing of Fig. 1 the armatures 65 and 66 are shown as actuated by a common relay field coil, but as indicated in Fig. 2 separate coils may be employed to actuate the clamping bar 41 and the resistor circuit-maker 65 if desired. Other measuring-element resistors such as photoelectric cells for measuring visibility, ceiling height, etc., may be added by using contact numbers 19, 21, etc. as above noted.

In the arrangement shown in Fig. 1 contact 18 of the outer bank is left blank for the reason hereinafter described.

6. OPERATION OF SYSTEM

The operation of the control system may now be outlined. At pre-set times of day, a clock operated switch 68 grounds the inner-bank contacts 2 to 25 of the rotary switch 50 and keeps them grounded for approximately 10 minutes, in the illustrative embodiment. This excites the field coil of the control relay 54 and operates the double pole armature 55—56. The radio transmitter 34 is thus started and also the small motor 57. The motor 57 drives two cams 70 and 71 on a common shaft 72 making a complete revolution once every 45 seconds in the form shown.

(A) SEQUENCE CAM

Cam 70 has two raised segments 70—a and 70—b located 5 seconds apart from 70—a to 70—b, and 40 seconds apart from 70—b to 70—a. These operate an associated cam switch 74 which completes the battery circuit through the field coil of the ratchet relay 51 and advances the arm 52 of the rotary switch 50 one step for each connection. Assuming that the raised segments 70—a and 70—b are in the position shown in Fig. 1 at the beginning of operation, the sequence of operations will be as follows:

Segment 70—a of cam 70 closes the cam switch 74, so that the field coil of the ratchet relay 51 is excited and the armature 60 is pulled over. When segment 70—a moves on, the cam switch 74 opens releasing the armature 60 and operating the ratchet on the rotary switch so that the moving arm 52 advances to step 2. Arm 52 will remain on step 2 for 5 seconds, when segment 70—b on cam 70 again operates the system to advance arm 52 to step 3, where it remains for 40 seconds; that is, until segment 70—a again engages the cam switch 74.

It will thus be evident that in the form shown the moving arm 52 will advance steadily, remaining on the odd numbered contacts for intervals of 40 seconds each, and on the even numbered contacts for intervals of 5 seconds each. Contacts 2 and 3 in the form shown allow a warm-up period for the radio transmitter 34. The remaining contacts provide for the connections of the coding circuits and instrument resistors, as already described.

The complete sequence of signals from the automatic weather station of Fig. 1 is given in Table 1. At the end of the observation period corresponding to contact 17, segment 70—a comes by the cam switch 74, thereby moving arm 52 to contact 18. This contact is left blank to allow segment 70—b to pass the cam switch 74 before "homing" of the rotary switch 50 occurs so as to leave cam 70 in proper position for starting a second sequence of signals.

The homing feature of the rotary switch 50 brings the rotary arm 52 to its zero position (contact 1) as shown in Fig. 1, after the completion of a full sequence of operation. However, since a full sequence takes about 6 minutes in the arrangement shown and since the clock switch 68 in the preferred embodiment remains closed for about 10 minutes, a second sequence of operation automatically begins. Once switch arm 52 has moved onto contacts 2, the completion of the second sequence is assured, since, even if the clock-switch opens, the field coil of the control relay 54 remains excited until the rotary switch 50 returns to its zero position.

TABLE 1.—*Sequence of signals from automatic weather station of Fig. 1*

| Contact number | Function | Time of duration |
|---|---|---|
| | | *Seconds* |
| 2 and 3 | Transmitter warm-up | 45 |
| 4 | Station call letters | 5 |
| 5 | Reference frequency | 40 |
| 6 | Code letter P (. — — .) | 5 |
| 7 | Pressure frequency | 40 |
| 8 | Code letter T (—) | 5 |
| 9 | Temperature frequency | 40 |
| 10 | Code letter H (. . . .) | 5 |
| 11 | Humidity frequency | 40 |
| 12 | Code letter D (— . .) | 5 |
| 13 | Wind direction frequency | 40 |
| 14 | Code letter V (. . . —) | 5 |
| 15 | Wind velocity frequency | 40 |
| 16 | Code letter R (. — .) | 5 |
| 17 | Rainfall frequency | 40 |
| 18 | Blank | 5 |
| 19 to 25 | Homing of relay | 2 |

(B) LIMIT-STOP CAM

The function of cam 71 may now be considered. After the second sequence of signals has been completed and switch arm 52 has returned to zero position it will be observed that cam 70 will normally be in position such that its switch 74 has just been passed by segment 70—b. The control relay 54 has opened so that, were it not for the cam switch 75 operated by the cam 71, the motor would stop. However, this cam switch 75 remains closed except when the actuating section of the cam 71 opens it. The motor 57 is thus kept running until this point so that cam 70 is automatically brought to the position shown in Fig. 1 before the motor 57 stops. The system is thus set up properly for the next operating period. The operation of cam 71 is normally not important. However, it guards against the possibility of reversal of the time of duration of the code and observation signals in the event of momentary failure of the rotary switch 50—for example, missing one contact.

7. THE RECEIVING SYSTEM

An ordinary aural type receiving set may be used in the reception of signals from the automatic weather station. Where operating conditions allow, counting of the signal pulses received in a given interval of time which, to distinguish from automatic recording, may be termed manual observations, are preferable, since accurate observations may then be obtained through severe interference. For a given measurement, the operator measures the time for a given number of pulses (usually 30 to 70). Simple division resolves the indication to pulses per second. This value is corrected proportionally for the reference-frequency drift, and the observation is evaluated by means of an appropriate chart. As above mentioned a recorder of any usual form may also be employed with this type of signal in the event an automatic record is desired.

From the foregoing description of a preferred embodiment, it is evident that the system of this invention may be made quite simple. It allows the use of standard radio transmitting and receiving equipment and of standard weather instruments with but slight modification. The modulation and control equipment is special, but is more complicated in explanation than in actual design or operation. As described the system is readily adaptable to the addition of other measuring elements such as the electrical hygrometer for improved measurement of relative humidity, photoelectric cells for measuring visibility and related factors, etc. The signals may be interpreted without the need of special measuring and recording equipment. Use of the system may thus be made by field crews.

For various details of design, calibration, curves, interpretive charts and experimental results obtained by the present invention which are not necessary to the understanding of the invention itself, reference may be had to Research Paper R. P. 1318, part of the Journal of Research of the National Bureau of Standards, vol. 25, August 1940 number, first published on or after September 10, 1940, and within one year prior to the filing of the present application.

From the foregoing description and the research paper incorporated by reference herein it will be seen that various modifications, adaptations and applications of the system may be made without departing from the scope of the present invention.

We claim as our invention:

1. An automatic weather station comprising a radio transmitter having a keying circuit and an on-off circuit, a plurality of factor responsive keying means (F to key, P to key, T to key, V directly to key, etc.) in keying relation to said keying circuit and adapted to produce keying in discrete aural pulses at rates dependent upon the values of the factors, some of said factors being meteorological factors, a plurality of coded keying means having codings related to said factors and selectably connectable in keying relation to said keying circuit, report initiating means for closing the on-off circuit of said transmitter to put the transmitter in operation, automatic step-by-step switching means for sequentially connecting in said keying circuit in a predetermined order predetermined ones of said coded keying means and said factor responsive keying means, and automatic means for maintaining operation of said switching means throughout a predetermined whole number of complete sequence cycles and for then opening the on-off circuit of said transmitter and stopping operation of said switching means in a predetermined step-off position.

2. An automatic weather station comprising a radio transmitter having a plurality of keying circuits; a wind velocity anemometer in one of said keying circuits for closing and opening the said circuit a number of times per interval of time related to wind velocity; a plurality of coded keying means associated with a second of said keying circuits for selectably closing and opening said second circuit in predetermined coded manners; a keying relay in a third of said keying circuits for closing and opening said third keying circuit at the rate of actuation of said relay; a relay control tube circuit normally passing plate current and connected to hold the contacts of said keying relay open, said control tube circuit comprising a biasing resistor, a rectifier applying rectified current through said resistor in a direction to bias said control tube to cut-off, a trigger oscillator operating at radio frequency and trigger modulated at a pulse rate within the discrete aural pulse range by a resistance-capacity network in its control circuit, said trigger oscillator having in its output a radio frequency by-pass and a connection for applying pulse frequency components of its output to said rectifier; a plurality of factor responsive resistances variable in proportion to the values of their respective controlling factors, at least some of said factors being meteorological factors; said coded keying means having codings respectively related to said factors, means including an automatic step-by-step switching device for sequentially completing said second keying circuit through respective ones of the coded keying means associated therewith, for sequentially completing said resistance capacity network through respective ones of said factor responsive resistances, and for periodically completing said first keying circuit through said anemometer device, said step-by-step switching means being arranged to inter-leave the respective wind velocity and other factor responsive keyings with the respective coded keyings; report initiating means for initiating operation of said switching means; and automatic means for maintaining operation of said switching means throughout a predetermined whole number of complete sequence cycles and thereafter stopping the operation of said switching means in a predetermined step-off position.

3. An automatic weather station of the type employing means variable in response to changes in a meteorologic factor to control a modulation signal indicative of the value of the factor, particularly characterized in that the controlled modulation signal is maintained in the discrete aural pulse range, enabling interpretation of the signal at the point of reception by simple counting of the number of pulses per second indicating the value of the factor.

4. The method of employing a keyed radio transmitter and an aural radio receiver to provide for transmission of meteorological data from a remote point, which consists in keying the transmitter in pulses within the discrete aural pulse range at rates varied to correspond to variations in the value of respective meteorological factors, and receiving and counting at the receiver the number of discrete aural pulses received per second and interpretable in terms of the value of the meteorological factor.

5. Means employing a keyed radio transmitter and an aural radio receiver to provide for transmission of meteorological data from a remote point, comprising a converter for converting the value of a meteorological factor into a corresponding value of resistance, a trigger oscillator, means for connecting the said value of resistance into the control circuit of said trigger oscillator, said value and oscillator being so related that throughout the range of values of resistance employed, said oscillator is triggered at a rate varied only within the discrete aural pulse range, and means for keying the radio transmitter in discrete aural pulses controlled in rate by the triggering of said oscillator, whereby the rate of keying of the transmitter within the discrete aural pulse range may be counted aurally at the receiver to obtain data as to the value of the meteorological factor concerned.

6. In the automatic weather station art, the method of conveying meteorological information which consists in translating the value of a meteorological factor into a number of pulses of energy per second within the discrete aural pulse range and calibrated to correspond in number per second to the value of the meteorological factor, and transmitting the said pulses to a receiving point, whereby the meteorological information may be aurally interpreted at the receiving point by simple counting of the total number of calibrated pulses aurally received in an interval of time.

HARRY DIAMOND.
WILBUR S. HINMAN, Jr.